UNITED STATES PATENT OFFICE.

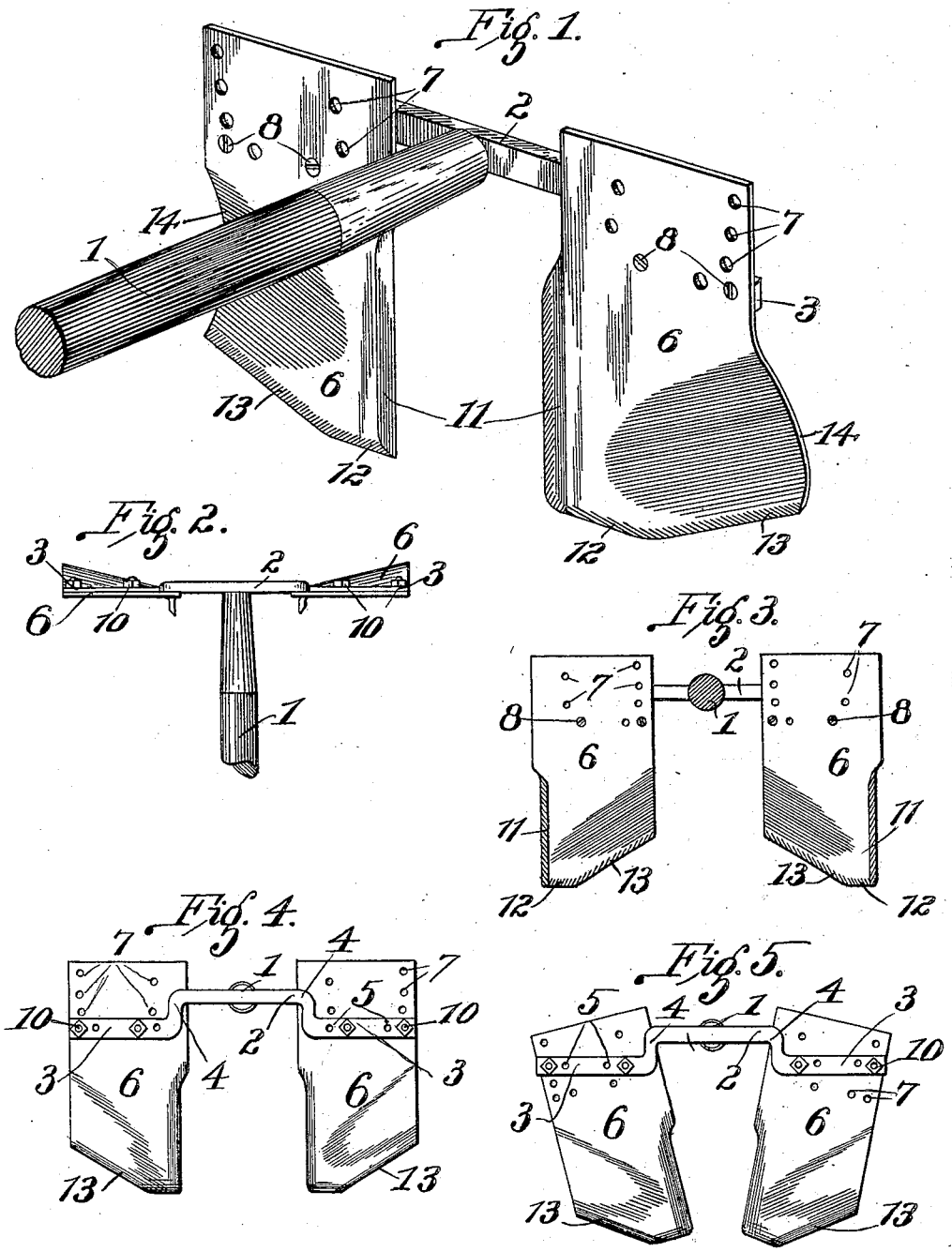

THOMAS GRASSHAW, OF COLUMBIA, ILLINOIS.

GARDEN-HOE.

No. 886,203.  Specification of Letters Patent.  Patented April 28, 1908.

Application filed November 18, 1907. Serial No. 402,706.

*To all whom it may concern:*

Be it known that I, THOMAS GRASSHAW, a citizen of the United States, and resident of Columbia, Monroe county, Illinois, have invented certain new and useful Improvements in Garden-Hoes, of which the following is a specification containing a full, clear, and exact description, reference being had to the accompanying drawings, forming a part hereof.

My invention relates to a garden hoe, my object being to construct a simple tool for hoeing and cultivating garden plants and the like, which tool is provided with a pair of adjustable and reversible shovels which can be readily arranged for different kinds of work.

To the above purposes, my invention consists of certain novel features of construction and arrangement of parts, which will be hereinafter more fully set forth, pointed out in the claims, and illustrated in the accompanying drawings, in which:—

Figure 1 is a perspective view of a hoe of my improved construction, with a portion of the handle broken away; Fig. 2 is a plan view of the hoe; Fig. 3 is an elevation of the forward end of the hoe, with the shovels reversed from the positions in which they are seen in Fig. 1; Fig. 4 is an end view of the hoe; Fig. 5 is an end view of the hoe, with the lower ends of the shovels adjusted toward one another.

Referring by numerals to the accompanying drawings:—1 designates the handle of the hoe, on the forward end of which is fixed a transversely disposed metal bar 2, the outer ends 3 of which are wider than the central portion of the bar, there being shoulders 4 formed between said widened ends and the central portion of said bar; and formed in each of the widened ends is a series of apertures 5. The shovels 6 of my improved hoe are constructed of metal plates, approximately rectangular in form, with the upper portions perfectly flat, and there being a series of apertures 7 formed in said flat upper portions; and passing through a pair of the apertures in each plate are screws or bolts 8 which pass through a pair of the apertures 5 and receive nuts 10 on their rear ends, thus rigidly fixing the plates to the ends 3 of the transverse bar 2. The apertures 7 are so arranged as that the plates can be adjusted vertically on the ends of the bar 2, and also shifted so that the lower ends of the plates are moved into positions adjacent one another, which adjustment is desirable for different classes of work.

Formed integral with the inner edge of each plate 6 is a vertically disposed blade 11, which projects at right angles to the body portion of the plate, and the entire lower edge of each plate is sharpened, as designated by 12. A portion of the lower outer corner of each plate is cut away, thus forming an edge 13, which is arranged at a slight angle relative the outer edge of the plate, and that portion of the plate immediately above this edge 13 is curved, as designated by 14, in a direction opposite the direction in which the blade 11 projects.

A hoe of my improved construction is particularly adapted for use in hoeing and cultivating on both sides of plants or shrubs which are planted in rows, and when it is desired to use the hoe in the cultivation of plants in rows, the plates 6 are adjusted so that their inner edges, or the blades 11, occupy vertical positions parallel with one another. The hoe is manipulated along the rows of plants or shrubs with the blades on each side thereof; and, as the hoe is thrown forward, the blades 11 cut through the soil on both sides of the plants or shrubs while the sharpened lower edges of the shovels cut into the soil and throw the same outward, owing to the curvature of the lower outer corners of said shovels.

The shovels can be adjusted vertically on the ends 3 in order that the hoe may be worked adjacent plants and shrubs of different heights; and, if desired, said shovels may be shifted from one end of the bar to the other, thus bringing the cutting blades 11 at the outer edges of the tool and causing the upturned soil to be carried toward the plants and shrubs. To bring the points of the shovels near one another so as to work the soil immediately adjacent the roots of plants or shrubs, said shovels are shifted into the positions seen in Fig. 5, which adjustment is obtained by providing the various sets of apertures 5 and 7.

A hoe of my improved construction is very simple, easily adjusted, and can be advantageously employed in the early cultivation of any small plants or shrubs.

I claim:—

1. A hoe, comprising a handle, a bar transversely positioned on the forward end of the handle, a pair of shovels adjustably arranged on the ends of the bar, the inner edges of which shovels are bent at right angles to the body portions and which bent edges are sharpened, and the outer lower corners of the shovels being bent at an angle relative the body portions of the shovels.

2. A hoe, comprising a handle, a bar transversely positioned on the forward end of the handle, a pair of shovels adjustably arranged on the ends of the bar, and integral cutting blades arranged on the inner edges of the shovels, and the outer lower corners being bent at an angle relative the body portions of the shovels.

3. A hoe, comprising a handle, a transversely arranged bar positioned on the forward end of the handle, in the ends of which bar are formed apertures, a pair of shovels, there being a series of apertures formed in each shovel, fastening devices adapted to engage through the apertures of the shovels and the bar for detachably connecting the same, the inner edges of which shovels are bent at right angles to the body portions and which bent edges are sharpened, and the outer lower corners of the shovels being bent at an angle relative the body portions of the shovels.

In testimony whereof, I have signed my name to this specification, in presence of two subscribing witnesses.

THOMAS his X mark GRASSHAW.

Witnesses:
HENRY GRASSHAW,
MARTIN P. SMITH.